United States Patent Office 3,374,612
Patented Mar. 26, 1968

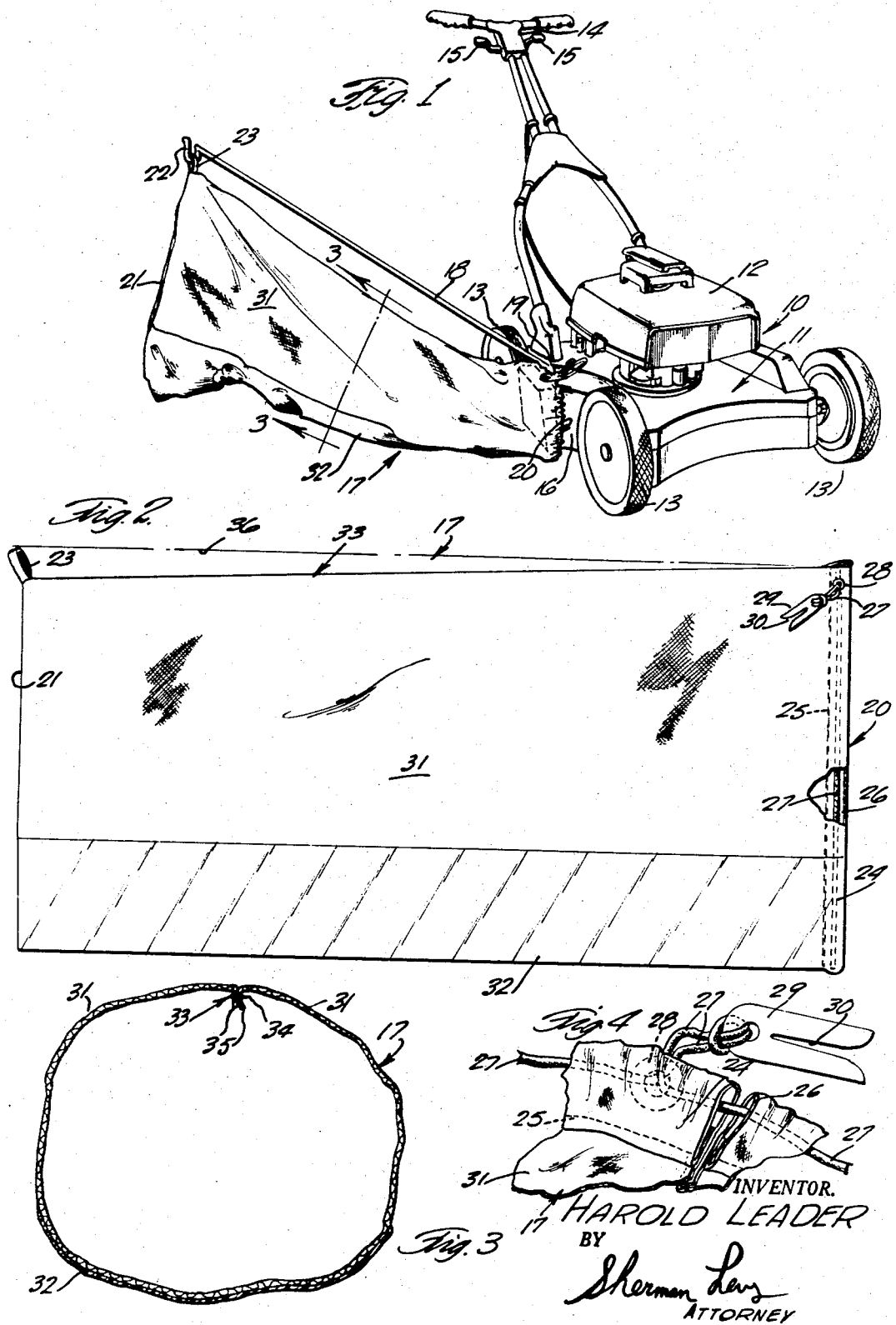

3,374,612
GRASS CATCHER BAG
Harold Leader, Birmingham, Ala., assignor to Allied
Flexible Products Inc., Birmingham, Ala.
Filed July 20, 1965, Ser. No. 473,309
3 Claims. (Cl. 56—202)

The present invention relates to bags or bagging attachments for rotary lawn mowers.

The primary object of this invention is to provide a grass catcher bag for a rotary lawn mower, wherein the bag is provided with a plastic coated bottom portion that provides improved wearing and slipping characteristics, and wherein the bag has a tapered configuration or shape that facilitates emptying of the bag, and wherein the bag is constructed so that grass can readily pass through the opening of the bag.

Another object of the present invention is to provide a grass catcher bag which has plastic uniquely applied to the bottom portion thereof so that fabrication of the bag is greatly facilitated or simplified as the bag can be finished by merely hemming the bottom and one side. There are no seams adjacent the bottom whereby there will be no weak points to develop and burst the bag, and wherein the entire bag has a tapered formation and it is constructed so that sewing will be minimized, and wherein the bag is adapted to be made on high-speed machines.

A further object of the present invention is to provide a bag of the type stated, wherein there are no seams adjacent to the plastic and enclosing the edge of the plastic impregnated and/or coated bottom, and the plastic coated and/or impregnated bottom feature is the most important aspect or feature of the present invention.

Still another object is to provide such a grass catcher bag that is efficient in operation and which is rugged in structure and foolproof in operation.

These and other objects of the invention will become apparent from a reading of the following specification and claims, together with the accompanying drawing, wherein like parts are referred to and indicated by like reference characters, and wherein:

FIG. 1 is a perspective view illustrating the grass catcher bag of the present invention attached to a lawn mower.

FIG. 2 is a plan view of the grass catcher bag showing the parts laid out flat for clarity of illustration.

FIG. 3 is an enlarged fragmentary view taken on line 3—3 of FIG. 1.

FIG. 4 is an enlarged fragmentary view illustrating the portion of the bag adjacent the cord.

Referring in detail to the drawings, the numeral 10 indicates a conventional lawn mower that includes the usual housing 11, as well as a power source such as an engine or motor 12, wheels 13, handle 14, and controls 15. The lawn mower 10 is further provided with a lateral discharge 16, FIG. 1.

According to the present invention there is provided an improved grass catcher bag which is indicated generally by the numeral 17, and the bag 17 is adapted to receive grass that is discharged from the lateral discharge member 16 and/or an adaptor of a kind that brings the bag rearward whether it is integral with or supplementary to the mower. The bag 17 is provided with an open end or opening 20 which registers with and is connected to the lateral discharge 16, and the opposite end portion 21 of the bag 17 is closed. The numeral 18 indicates a support member or rod which is adapted to be connected to the lawn mower 10 as at 19. The upper outer end portion of the rod 18 is provided with a lug or hook portion 22 for engaging loop 23 on the upper end of the bag 17 whereby the bag is supported in the proper manner.

As shown in the drawings, a portion of the bag 17 adjacent the opening 20 is folded over upon itself as indicated by the numeral 24, FIG. 4, and this folded portion 24 is adapted to be stitched as at 25 to the main body portion 31 of the bag. The main body portion 31 is adapted to be made of a suitable material, such as a pervious material. However, other materials may be used, depending on whether there is an orifice designed for air release into the bag. The folded over stitched portion 24 has cord 27 extended therethrough and portions of the cord 27 are adapted to be extended through grommet 28 affixed to the bag. As shown in the drawings, a clamp or bracket 29 is suitably attached to the end of the cord and the clamp 29 has a slot 30 therein.

The lower portion of the bag 17 has plastic material 32 thereon for a purpose to be later described. In addition, the upper portion of the bag is provided with an elongated seam 33 which is formed by stitching together by means of a line of stitches 34 adjacent portions 35 of the bag.

As shown in FIG. 2, the bag 17 has a tapered configuration or formation so that it will be seen that the bag is wider adjacent the opening 20 than it is at the opposite end 21.

From the foregoing it will be seen that there has been an improved grass catcher bag for a lawn mower, such as the lawn mower 10, but it should be understood that the bag is not restricted to any particular type of lawn mower and the bag can be used with various types of lawn mowers.

As shown in the drawings, it will be seen that the open end 20 is adapted to be connected to the lateral discharge 16, and the cord 27 can then be pulled taut or tight, and portions of the cord can be arranged in engagement with the clamp 29 to maintain the cord tight so that the bag 17 will be properly supported in place on the lawn mower. The bag 17 of the present invention is an improvement over prior grass catcher bags, such as shown in Patent No. 3,047,998.

As shown in FIG. 1 of the present invention, the rod 18 has its upper outer end portion 22 engaging the loop 23 to properly support the bag 17 in raised position. Thus, with the lawn mower 10 operating, as the lawn mower is moved along the lawn or grass the grass cuttings will be thrown or discharged outwardly into the open end 20 and into the bag 17. When it is desired to empty the bag, it is only necessary to loosen the cord 27 and remove the loop 23 from the upper outer end portion 22 so that the bag can be carried to a suitable point away from the lawn mower and emptied out through the opening 20. The bag 17 can be replaced on the lawn mower to be subsequently used in the proper manner.

An important aspect or feature of the present invention is the provision of the plastic material 32 of the lower portion of the bag 17. This plastic material 32 may be provided on the bag 17 in various manners. For instance, it may be impregnated along the lower longitudinal portion of the bag, it being understood that the bag is made of a suitable pervious material, such as burlap or the like, or the plastic material 32 may be laminated on the lower longitudinal portion of the bag. This stripe of plastic 32 along the lower longitudinal portion of the bag imparts improved slipping qualities to the bag as the bag is moved along the lawn or the like, and in addition provides other improved advantages as later described in this application.

Also, another important aspect or feature of the invention is the provision of the seam 33 which is arranged along the upper longitudinal portion of the bag, at the opposite section from the plastic 32. In addition, as shown in FIG. 2, the bag 17 has a generally tapered configuration so that, for example, the bag at the end portion 21 is of less width than it is at the end portion 20. The numeral 36 indicates an imaginary line in FIG. 2, and it will be seen in FIG. 2 that the angle or distance between the imaginary line 36 and the seam 33 increases from right to left, and this is to illustrate the tapered construction of the bag.

Some of the important features or aspects of the grass catcher bag of the present invention are as follows:

The plastic coated bottom portion 32 helps minimize sewing costs, and provides superior wearing and slipping qualities so that, for example, the plastic portion 32 will slip more efficiently across the lawn as the lawn mower is used, without causing undue wear on the bag. The tapered shape as shown in FIG. 2 is advantageous because it permits the grass which lumps up to easily fall out of the bag when the bag is being emptied. With further reference to the tapered shape, the end 20 is wider than the end 21 so that the emptying of the bag can take place more readily.

The most important aspect of the present invention is that there are no seams adjacent to the plastic and enclosing the edge of the plastic impregnated and/or coated bottom. This plastic impregnated and/or coated bottom feature is the most important aspect of the present invention, and it is to be understood that the present invention covers a bag of the type illustrated as well as bags having a different shape. Also, the present invention is adapted to include or embody a bag, such as a bag using the plastic coating having an opening for emptying the bag, such as the roto rake type as set forth in applicant's prior Patent No. 3,047,998.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

What is claimed is:

1. As a new article of manufacture, a grass catcher bag having an integral closed end, the other end being open and adapted to be attached to a mower discharge duct and a plastic bottom portion, said bag having a tapered formation so that it is wider at the open end than it is at the closed end, said bag having only one longitudinal seam on the upper portion thereof opposite the plastic bottom portion.

2. The structure as defined in claim 1, and including a cord surrounding the open end and adapted to secure said bag to said discharge.

3. In a grass catcher bag for a rotary lawn mower of the type that includes a housing and a lateral discharge, said bag having an opening in one end for registry with said discharge, a portion of the bag adjacent the opening being folded over and stitched to provide a portion having a cord extended therethrough which is adapted to surround said lateral discharge, a clamp connected to said cord and adapted to secure said cord and bag on said discharge, a loop on the upper outer portion of the bag adapted to be supported by the outer end of a laterally extending support member on said mower, the lower portion of said bag having a plastic material thereon, and said bag having a tapered formation so that it is wider adjacent the open end than it is at the upper end thereof when the bag is disengaged from said lateral discharge.

References Cited
UNITED STATES PATENTS

| | | | |
|---|---|---|---|
| 2,630,190 | 3/1953 | Cordray | 55—381 |
| 2,734,541 | 2/1956 | Ottinger | 150—2 |
| 2,955,404 | 10/1960 | Strasel et al. | 56—202 |
| 3,008,284 | 11/1961 | Bright | 56—202 X |
| 3,047,998 | 8/1962 | Leader et al. | 56—202 |
| 3,212,248 | 10/1965 | Leader | 56—202 |

ABRAHAM G. STONE, *Primary Examiner.*

RUSSELL R. KINSEY, *Examiner.*